(12) United States Patent
Kang et al.

(10) Patent No.: US 10,618,559 B2
(45) Date of Patent: Apr. 14, 2020

(54) FRONT VEHICLE BODY REINFORCING STRUCTURE

(71) Applicants: Hyundai Motor Company, Seoul (KR); Kia Motors Corporation, Seoul (KR)

(72) Inventors: SeungMin Kang, Gyeonggi-do (KR); Seho Ryu, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 15/822,013

(22) Filed: Nov. 24, 2017

(65) Prior Publication Data

US 2019/0106153 A1  Apr. 11, 2019

(30) Foreign Application Priority Data

Oct. 11, 2017  (KR) .................. 10-2017-0131550

(51) Int. Cl.
| | |
|---|---|
| *B62D 21/15* | (2006.01) |
| *B60R 19/02* | (2006.01) |
| *B60R 19/34* | (2006.01) |
| *B62D 25/08* | (2006.01) |

(52) U.S. Cl.
CPC .......... *B62D 21/152* (2013.01); *B60R 19/023* (2013.01); *B60R 19/34* (2013.01); *B62D 25/082* (2013.01)

(58) Field of Classification Search
CPC .. B62D 25/082; B62D 25/085; B62D 21/152; B60R 2021/009; B60R 2021/0023
See application file for complete search history.

(56) References Cited

U.S. PATENT DOCUMENTS

| | | | | |
|---|---|---|---|---|
| 7,469,956 | B2 | 12/2008 | Yasuhara et al. | |
| 8,789,877 | B2 * | 7/2014 | Ohnaka | B62D 21/152 |
| | | | | 296/193.09 |
| 8,991,907 | B1 * | 3/2015 | Kim | B62D 25/082 |
| | | | | 296/193.09 |
| 9,855,970 | B2 * | 1/2018 | Kitakata | B62D 21/152 |
| 10,266,208 | B2 * | 4/2019 | Kang | B62D 25/081 |
| 2013/0241233 | A1 * | 9/2013 | Ohnaka | B62D 21/152 |
| | | | | 296/187.1 |
| 2016/0039373 | A1 * | 2/2016 | Yamada | B60R 19/24 |
| | | | | 293/132 |
| 2016/0052554 | A1 * | 2/2016 | Ozawa | B62D 21/152 |
| | | | | 296/187.09 |

(Continued)

*Primary Examiner* — Hilary L Gutman
(74) *Attorney, Agent, or Firm* — Mintz Levin Cohn Ferris Glovsky and Popeo, P.C.; Peter F. Corless

(57) ABSTRACT

A front vehicle body reinforcing structure capable of improving collision stability at the time of a head-on collision, an offset collision, or a small overlap collision of a vehicle is provided. The front vehicle body reinforcing structure reinforces a portion where a front side member and a fender apron member of a front vehicle body are connected to each other. The front vehicle body reinforcing structure includes an insert member which is inserted into a front end portion of the front side member and a front end mounting bracket which is connected to a front end of the insert member and fastened to a different portion of the vehicle body. The fender apron member supports a rear end of a portion of the insert member that is separate from the front side member.

13 Claims, 4 Drawing Sheets

(56) References Cited

U.S. PATENT DOCUMENTS

| | | | |
|---|---|---|---|
| 2016/0185392 A1* | 6/2016 | Higuchi | B62D 25/085 |
| | | | 180/312 |
| 2016/0207573 A1* | 7/2016 | Kitakata | B62D 21/152 |
| 2017/0113726 A1* | 4/2017 | Matsushima | B62D 21/152 |
| 2017/0113727 A1* | 4/2017 | Nakamoto | B60R 19/34 |
| 2017/0113735 A1* | 4/2017 | Kawabe | B62D 25/08 |
| 2017/0210425 A1* | 7/2017 | Sekiguchi | B62D 25/08 |
| 2017/0217501 A1* | 8/2017 | Takeda | B62D 21/152 |

* cited by examiner

FRONT VEHICLE BODY REINFORCING STRUCTURE

CROSS-REFERENCE TO RELATED APPLICATION

This application claims priority to and the benefit of Korean Patent Application No. 10-2017-0131550 filed on Oct. 11, 2017, the entire contents of which are incorporated herein by reference.

BACKGROUND

(a) Field of the Disclosure

The present disclosure relates to a front vehicle body reinforcing structure, and more particularly, to a front vehicle body reinforcing structure with an improved performance during a head-on collision and a front small overlap collision of a vehicle.

(b) Description of the Related Art

Generally, a front vehicle body of a vehicle has a framework structure positioned at a front side in a front and rear direction of the vehicle and defines an engine compartment. The front vehicle body includes a front end module that forms a front side of the engine compartment and is mounted with a cooling module, head lamps, and the like, fender apron members that form the left and right sides of the engine compartment and provide cavities in which vehicle wheels are installed, and a dash panel which is positioned at a rear side of the engine compartment and separate a passenger compartment from the engine compartment.

Additionally, front side members which extend in the front and rear direction of the vehicle are disposed at a lower side of the engine compartment at both the left and right both of the vehicle to improve structural rigidity of the front vehicle body. A sub frame is disposed at a lower side of the front side member to mount and support a suspension system as well as the engine and a transmission installed in the engine compartment. A bumper beam extends in a width direction of the vehicle and is disposed at a front tip portion of the front side member to improve a performance during a frontal collision of the vehicle. The bumper beam is connected with a crash box to the front tip portion of the front side member in the front and rear direction of the vehicle.

When the vehicle having the front vehicle body having the aforementioned structure experiences a frontal collision with a type of small overlap with a collision object such as an obstacle or other vehicles while the vehicle travels, (e.g., when a collision object such as a small overlap barrier is deviated to one side in the width direction of the vehicle and collides with an outer periphery of the vehicle body) the collision object passes over the front side member and collides with the outer periphery of the vehicle body which has relatively low rigidity. Accordingly, the structural integrity is compromised during a front small overlap collision of the vehicle and occupant safety is impacted and damage is caused to the vehicle due to the collision.

Recently, techniques for coping with the small overlap collision by reinforcing the outer periphery of the vehicle body have been proposed. For example, a structure for extending a front tip portion of a front fender apron member to the front tip portion of the front side member and connecting the front tip portion of the front fender apron member to the front tip portion of the front side member using a connecting member or a structure for mounting a reinforcing member to an exterior side of the front side member to block penetration of the collision object has been proposed. However, the proposed structures are not effective during the front small overlap collision.

The above information disclosed in this section is merely for enhancement of understanding of the background of the disclosure and therefore it may contain information that does not form the prior art that is already known in this country to a person of ordinary skill in the art.

SUMMARY

The present disclosure provides a front vehicle body reinforcing structure capable of improving a performance in supporting by a fender apron member, impact energy transmitted to a front side member during a head-on collision, an offset collision, or a small overlap collision of a vehicle. Accordingly, the stability during a collision is improved by appropriately dispersing impact energy applied to the front side member and the fender apron member to other parts of a vehicle body.

In an aspect of an exemplary embodiment of the present disclosure a front vehicle body reinforcing structure for reinforcing a portion where a front side member and a fender apron member of a front vehicle body are connected to each other, the front vehicle body reinforcing structure may include an insert member which is inserted into a front end portion of the front side member; and a front end mounting bracket which is connected to a front end of the insert member and fastened to a different portion of a vehicle body.

In some exemplary embodiments, the fender apron member may support a rear end of a portion of the insert member separate from the front side member. In particular, the insert member and the front side member may have three-dimensional box structures that form closed cross sections in a front and rear direction of the vehicle body. The front side member may form the three-dimensional box structure when a front side inner panel disposed relatively inward in the width direction of the vehicle body and a front side exterior panel disposed relatively outward in the width direction of the vehicle body are coupled to each other.

In other exemplary embodiments, a portion of the insert member may be inserted into the front end portion of the front side member to position a front end of the front side inner panel to overlap the front end of the insert member and a front end of the front side exterior panel may be in contact with a rear end of the insert member. The front end of the front side inner panel and the front end of the insert member may be disposed on the same plane based on the front and rear direction of the vehicle body.

Additionally, a front end portion of the fender apron member may have a three-dimensional box structure that forms a closed cross section in a vertical direction of the vehicle body. The fender apron member may form a three-dimensional box structure when a fender apron inner panel disposed relatively inward in the width direction of the vehicle body and a fender apron outer panel disposed relatively outward in the width direction of the vehicle body are coupled to each other.

In some exemplary embodiments, an inner surface of the three-dimensional box structure in the width direction of the vehicle body, formed at the front end portion of the fender apron member, may be in contact with an outer surface of the front side member in the width direction of the vehicle body. An inner surface of the fender apron member and the outer surface of the front side member in the width direction of the vehicle body may be coupled together (e.g., welded or the like).

Further, a front side of the three-dimensional box structure formed at the front end portion of the fender apron member may be in contact with the rear end of the portion of the insert member that is separate from the front side member. A front side of the fender apron member and the rear end of the insert member may be coupled together (e.g., welded or the like). The insert member may have a "U"-shaped cross section having an open front side and a closed rear side.

In other exemplary embodiments, an extension portion, that extends further toward a front side of the vehicle body than a portion for supporting the rear end of the insert member may be formed on the fender apron member. The insert member may be press-fitted between the front side member and the extension portion.

BRIEF DESCRIPTION OF THE DRAWINGS

The drawings are provided for reference in describing exemplary embodiments of the present disclosure and the spirit of the present disclosure should not be construed only by the accompanying drawings.

DETAILED DESCRIPTION

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
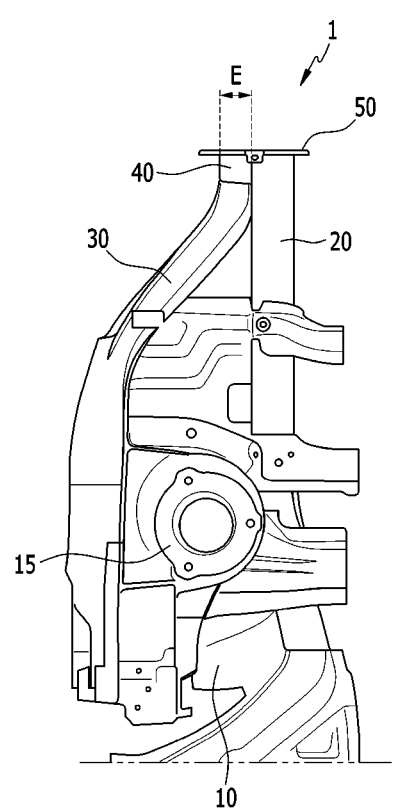
FIG. 1 is an exemplary top plan view of a front vehicle body reinforcing structure according to an exemplary embodiment of the present disclosure.
Figure 2:
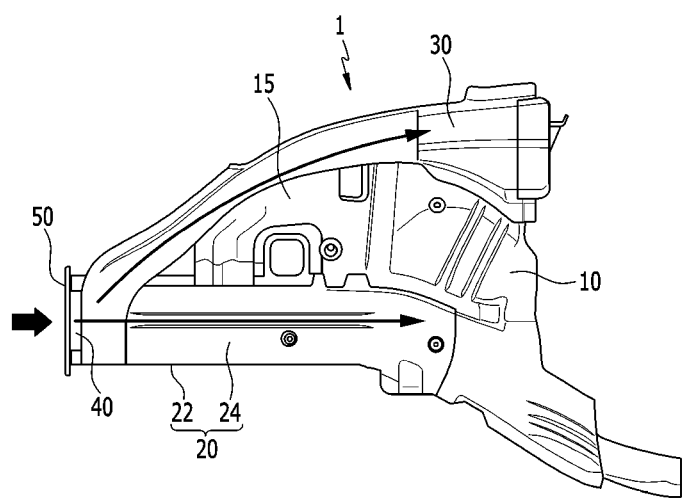
FIG. 2 is an exemplary side view of the front vehicle body reinforcing structure according to the exemplary embodiment of the present disclosure.

An exemplary embodiment of the present disclosure will hereinafter be described in detail with reference to the accompanying drawings. FIG. 1 is an exemplary top plan view of a front vehicle body reinforcing structure according to an exemplary embodiment of the present disclosure. FIG. 2 is an exemplary side view of the front vehicle body reinforcing structure according to the exemplary embodiment of the present disclosure. As illustrated in FIGS. 1 and 2, a front vehicle body reinforcing structure 1 according to the exemplary embodiment of the present disclosure may include a structure for reinforcing a portion where a front side member 20 and a fender apron member 30 overlap each other at a front side of a shock absorber housing 15.

A shock absorber (not illustrated) may be disposed in the shock absorber housing 15. In particular, the shock absorber housing 15 may be disposed to surround the shock absorber. Since the shock absorber is obvious to those with ordinary skill in the pertinent art (hereinafter, referred to as those skilled in the art), a description thereof will be limited. The front side member 20 may be disposed within the shock absorber housing 15 based on a width direction of a vehicle body 10, and may be connected to an inner lower end of the shock absorber housing 15 based on the width direction of the vehicle body 10.

The fender apron member 30 may be disposed external to the front side member 20 based on the width direction of the vehicle body 10 with the shock absorber housing 15 interposed therebetween. Additionally, a front end portion of the fender apron member 30 may be connected to a front end portion of the front side member 20 which extends further toward a front side of the vehicle body 10 compared to the shock absorber housing 15. Further, the fender apron member 30 extends to be inclined upward toward a rear side of the vehicle body 10 and may be connected to a fender apron upper member (not illustrated). In other words, the fender apron member 30 may connect the front side member 20 and the fender apron upper member. Therefore, the fender apron member 30 may be configured to absorb and disperse a load applied to the front side member 20 extending in the front and rear direction of the vehicle body during a head-on collision, an offset collision, or a small overlap collision. For example, the offset collision refers to a partial head-on collision, and the small overlap collision refers to a type of an offset collision. In other words, a small overlap collision is a collision of a local position having the majority of the load applied to the front side member 20 at one side.

Further, the fender apron upper member may be disposed external to a cowl (not illustrated) based on the width direction of the vehicle body 10. The fender apron upper member may be a member connected to an exterior upper end of the shock absorber housing 15 based on the width direction of the vehicle body 10 and may form the vehicle body 10. Since the fender apron upper member is obvious to those skilled in the art, a detailed description thereof will be omitted.

Figure 3:
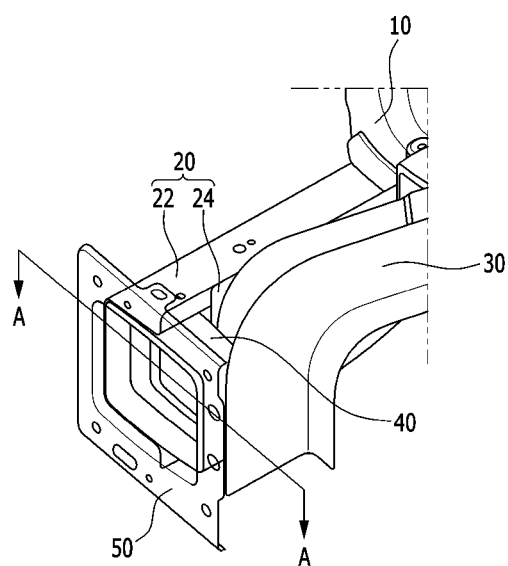
FIG. 3 is an exemplary partial perspective view of the front vehicle body reinforcing structure according to the exemplary embodiment of the present disclosure.

FIG. 3 is an exemplary partial perspective view of the front vehicle body reinforcing structure according to the exemplary embodiment of the present disclosure. As illustrated in FIGS. 1 to 3, the front vehicle body reinforcing structure 1 according to the exemplary embodiment of the present disclosure further includes an insert member 40 and a front end mounting bracket 50. The insert member 40 may be inserted into a front end portion of the front side member 20. Additionally, the insert member 40 and the front side member 20 may have a three-dimensional box structure that forms a closed cross section in the front and rear direction of the vehicle body 10.

Further, the front side member 20 may include a front side inner panel 22 and a front side outer panel 24 and may form a three-dimensional box structure as the front side inner panel 22 disposed relatively inward in the width direction of the vehicle body 10 and the front side outer panel 24 disposed relatively outward in the width direction of the vehicle body 10 are coupled to each other. In particular, a front end of the front side inner panel 22 may extend further forward than a front end of the front side outer panel 24 and may overlap a front end of the insert member 40, and a part of the insert member 40 may be inserted into the front end portion of the front side member 20. Accordingly, the front end of the front side outer panel 24 may be in contact with a rear end of the insert member 40. In other words, the front end of the front side inner panel 22 and the front end of the insert member 40 may be disposed on the same plane based on the front and rear direction of the vehicle body 10.

The front end mounting bracket 50 may be connected to the front end of the front side inner panel 22 and the front end of the insert member 40, and may be fastened to a front bumper beam (not illustrated). In other words, the front end mounting bracket 50 may position the front bumper beam to be mounted on the front vehicle body reinforcing structure 1. Since, the front bumper beam is obvious to those skilled in the art, a description thereof will be omitted.

Figure 4:
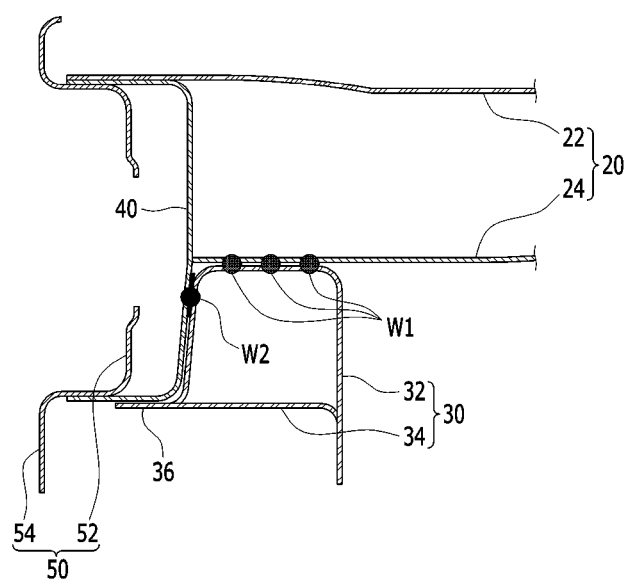
FIG. 4 is an exemplary cross-sectional view taken along line A-A of FIG. 3 according to the exemplary embodiment of the present disclosure.

FIG. 4 is an exemplary cross-sectional view taken along line A-A of FIG. 3. As illustrated in FIGS. 2 to 4, the front end portion of the fender apron member 30 may include a three-dimensional box structure that forms a closed cross section in the vertical direction of the vehicle body 10. In other words, an extension direction of the front end portion of the fender apron member 30 and an extension direction of the front end portion of the front side member 20 are not parallel to each other, but intersect each other.

The fender apron member 30 may include a fender apron inner panel 32 and a fender apron outer panel 34, and may form a three-dimensional box structure when the fender apron inner panel 32 is disposed inward in the width direction of the vehicle body 10 and the fender apron outer panel 34 is disposed outward in the width direction of the vehicle body 10 are coupled to each other. For example, a front side of the three-dimensional box structure formed at the front end portion of the fender apron member 30 may be in contact with a rear end of another portion of the insert member 40 that is separate from the front side member 20. In other words, the front side of the three-dimensional box structure formed at the front end portion of the fender apron member 30 and the front end of the front side outer panel 24 may be disposed on the same plane based on the front and rear direction of the vehicle body 10. Additionally, at the front end portion of the fender apron member 30, an inner surface of the fender apron inner panel 32 in the width direction of the vehicle body 10 may be in contact with an outer surface of the front side outer panel 24 in the width direction of the vehicle body 10.

Referring to FIG. 4, the insert member 40 may have a "U"-shaped cross section with an open front side and a closed rear side. Additionally, an entire cross section of the front end mounting bracket 50 may have a "U" shape with an open front side and a closed rear side. Further, an extension portion 36, which extends further toward the front side of the vehicle body 10 than the front side of the three-dimensional box structure formed at the front end portion of the fender apron member 30, may be formed at the front end portion of the fender apron outer panel 34 of the fender apron member 30.

At the front end portion of the fender apron member 30, the inner surface of the fender apron inner panel 32 in the width direction of the vehicle body 10 and the outer surface of the front side outer panel 24 in the width direction of the vehicle body 10 may be coupled together (e.g., welded W1). The insert member 40 may be press-fitted to enable the inner surface of the insert member 40 in the width direction of the vehicle body 10 is in contact with the outer surface of the front side inner panel 22 in the width direction of the vehicle body 10, and the outer surface of the insert member 40 in the width direction of the vehicle body 10 may be in contact with the inner surface of the extension portion 36 in the width direction of the vehicle body 10. Additionally, the closed rear side of the front end mounting bracket 50 may be press-fitted into the insert member 40 through the opened front side of the insert member 40. Further, the front side of the three-dimensional box structure formed at the front end portion of the fender apron member 30 and the closed rear side of the insert member 40 may be coupled together (e.g., welded W2).

In particular, as the inner surface of the fender apron inner panel 32 and the outer surface of the front side outer panel 24 are coupled together (e.g., welded W1), a degree of design freedom in respect to connection between the members of the front vehicle body reinforcing structure 1 that forms the vehicle body 10 may be improved. Additionally, as the front side of the fender apron member 30 and the rear side of the insert member 40 are coupled together (e.g., welded W2), the coupling rigidity between the members of the front vehicle body reinforcing structure 1 may be improved.

According to the exemplary embodiment of the present disclosure as described above, the fender apron member 30 and the front side member 20 overlap each other in the width direction and an area that absorbs a load during a small overlap collision may be increased by a predetermined width E (see FIG. 1). Therefore, a performance in dispersing a load may be improved. Additionally, the three-dimensional box structure of the insert member 40 and the three-dimensional box structure of the front side member 20 may be coupled to each other by insertion. The fender apron member 30 may support the rear end of the insert member 40 and the structural rigidity may be improved.

While this disclosure has been described in connection with what is presently considered to be exemplary embodiments, it is to be understood that the disclosure is not limited to the disclosed exemplary embodiments. On the contrary, it is intended to cover various modifications and equivalent arrangements included within the spirit and scope of the appended claims.

What is claimed is:

1. A front vehicle body reinforcing structure, comprising:
    a portion of a front of a vehicle body having a front side member and a fender apron member connected to each other;

an insert member that is inserted into a front end portion of the front side member; and a front end mounting bracket that is connected to a front end of the insert member and fastened to a different portion of the vehicle body, wherein the fender apron member supports a rear end of a portion of the insert member that is separate from the front side member, and wherein the insert member has a "U"-shaped cross section having an open front side and a closed rear side.

2. The front vehicle body reinforcing structure of claim 1, wherein the insert member and the front side member have three-dimensional box structures that form closed cross sections in a front and rear direction of the vehicle body.

3. The front vehicle body reinforcing structure of claim 2, wherein the front side member forms the three-dimensional box structure as a front side inner panel disposed inward in the width direction of the vehicle body and a front side outer panel disposed outward in the width direction of the vehicle body are coupled to each other.

4. The front vehicle body reinforcing structure of claim 3, wherein the portion of the insert member is inserted into the front end portion of the front side member to position a front end of the front side inner panel to overlap the front end of the insert member and a front end of the front side outer panel is in contact with a rear end of the insert member.

5. The front vehicle body reinforcing structure of claim 4, wherein the front end of the front side inner panel and the front end of the insert member are disposed on the same plane based on the front and rear direction of the vehicle body.

6. The front vehicle body reinforcing structure of claim 1, wherein a front end portion of the fender apron member has a three-dimensional box structure that forms a closed cross section in a vertical direction of the vehicle body.

7. The front vehicle body reinforcing structure of claim 6, wherein the fender apron member forms a three-dimensional box structure as a fender apron inner panel that is disposed inward in the width direction of the vehicle body and a fender apron outer panel that is disposed outward in the width direction of the vehicle body are coupled together.

8. The front vehicle body reinforcing structure of claim 6, wherein an inner surface of the three-dimensional box structure in the width direction of the vehicle body, which is formed at the front end portion of the fender apron member, is in contact with an outer surface of the front side member in the width direction of the vehicle body.

9. The front vehicle body reinforcing structure of claim 8, wherein an inner surface of the fender apron member and the outer surface of the front side member in the width direction of the vehicle body are coupled together.

10. The front vehicle body reinforcing structure of claim 6, wherein a front side of the three-dimensional box structure formed at the front end portion of the fender apron member is in contact with the rear end of the portion of the insert member that is separate from the front side member.

11. The front vehicle body reinforcing structure of claim 10, wherein a front side of the fender apron member and the rear end of the insert member are coupled together.

12. The front vehicle body reinforcing structure of claim 1, wherein an extension portion, which extends further toward a front side of the vehicle body than a portion for supporting the rear end of the insert member is formed on the fender apron member.

13. The front vehicle body reinforcing structure of claim 12, wherein the insert member is press-fitted between the front side member and the extension portion.

* * * * *